United States Patent
Mizutani et al.

(10) Patent No.: US 6,603,744 B2
(45) Date of Patent: *Aug. 5, 2003

(54) CONNECTION ESTABLISHMENT METHOD, COMMUNICATION METHOD, STATE CHANGE TRANSMISSION METHOD, STATE CHANGING METHOD, WIRELESS APPARATUS, WIRELESS DEVICE, AND COMPUTER

(75) Inventors: Akihiko Mizutani, Zushi (JP); Hiroshi Ishikawa, Shizuoka (JP); Amrit Pant, Cambridge, MA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,059

(22) Filed: Aug. 6, 1998

(65) Prior Publication Data

US 2003/0043771 A1 Mar. 6, 2003

(30) Foreign Application Priority Data

Aug. 7, 1997 (JP) .............................................. 9-212784
Oct. 14, 1997 (JP) .............................................. 9-280214

(51) Int. Cl.[7] .............................................. H04B 7/00
(52) U.S. Cl. ...................................... 370/310; 370/338
(58) Field of Search .................................. 370/230, 241, 370/252, 310, 328, 338, 445–8, 469, 315, 345, 346–7

(56) References Cited

U.S. PATENT DOCUMENTS

| | | | | |
|---|---|---|---|---|
| 5,890,015 A | * | 3/1999 | Garney et al. ................. | 710/62 |
| 5,970,062 A | * | 10/1999 | Bauchot ...................... | 370/345 |
| 5,983,073 A | * | 11/1999 | Ditzik ........................ | 455/11.1 |
| 6,081,533 A | * | 6/2000 | Laubach et al. ............ | 370/421 |
| 6,212,175 B1 | * | 4/2001 | Harsch ....................... | 370/338 |

* cited by examiner

Primary Examiner—David Vincent
(74) Attorney, Agent, or Firm—Douglas W. Cameron; Anne V. Dougherty

(57) ABSTRACT

A wireless hub, connected to the USB bus of a computer, and a wireless port, connected to a USB interface of a peripheral device, are provided, and wireless communication is performed between the two. The wireless hub performs communication with the computer by converting a USB packet routed to a device into a wireless signal, and a wireless signal received from a device into a USB packet. The wireless port attached to each device also converts a wireless signal into a USB packet and vice versa. While it is normal for a plurality of wireless ports to be connected to a single wireless hub, an arrangement of one wireless hub and a corresponding single wireless port is also possible. A wireless hub and a wireless port each have a device identifier assigned to them, and in the USB-wireless conversion, a non-specific destination identified by a USB address and bus topology is converted into a device identifier. Inter-host communication is enabled by using the device identifier.

32 Claims, 8 Drawing Sheets

CONNECTION ESTABLISHMENT METHOD, COMMUNICATION METHOD, STATE CHANGE TRANSMISSION METHOD, STATE CHANGING METHOD, WIRELESS APPARATUS, WIRELESS DEVICE, AND COMPUTER

CROSS-REFERENCE TO RELATED APPLICATIONS

This application claims priority from Japanese Patent Application Nos: 09-212784 and 09-280214, filed Aug. 7, 1997 and Oct. 14, 1997 repectively.

FIELD OF THE INVENTION

This invention relates to a wireless communication method, and specifically to a method for connecting a device to a wireless USB (Universal Serial Bus).

BACKGROUND OF THE INVENTION

The USB is specified as a standard "Point to Multipoint" interface, which connects a computer to low and medium speed devices, such as a mouse, a keyboard and a printer, as detailed in co-pending Japanese Patent Application No: 09-212784, assigned to the present assignee, the teachings of which are incorporated by reference herein. While conventionally a connection destination has to be selected for each device, such as a keyboard port for a keyboard, a mouse port for a mouse, a printer port for a printer, and a serial port for a modem, when the USB is employed, a USB device need only be connected to a USB port. In addition, since the USB supports the Hot Plug & Unplug function, connections can be easily changed, even when the computer is in use. In the mobile notebook computer and PDA (Personal Digital Assistant) environment, however, even the connection of a USB cable imposes a large load on a user. Damage to a connector on the host side may be caused by inadvertent insertion and removal of a connector on the device side. It is preferable, therefore, that for a mobile environment a wireless connection be made available.

Typical currently-available wireless communication systems employ the wireless LAN IEEE 802.11 standard and the IrDA communication method. The IEEE 802.11 standard was designed mainly for communication between computers, and is not suitable for communication between computers and peripheral devices. IrDa was designed with the assumption that it would be used for point to point connections, not point to multipoint connections, such as the USB connection. The USB is regarded as a main interface for future apparatuses connected to PCs (Personal Computers), and it is assumed that it will be incorporated in many apparatuses. If a wireless USB can be provided, it can constitute means for the very easy connection of peripheral devices.

IBM TDB, Vol. 40, No. 04, (April 1997) pp. 87–88 teaches a wireless USB. This reference, however, does not take into account problems that will arise with the wireless USB. In IBM TDB, Vol. 37, No. 04B, pp 91–93, (April 1994), a system is disclosed for connecting a wireless module to a conventional bus in a computer and for connecting the wireless module to a peripheral device connected to the bus. In this reference, however, problems caused by a wireless USB are not described.

What is desired is a system configuration for a USB that enables a computer to manage all the devices connected to the USB, and performs polling to acquire communicated data and to detect state changes. Solutions for the following four problems must be found to provide a satisfactory wireless system configuration.

(1) Designation of packet destinations—The destination of a USB packet is designated by using a USB address or non-specified bus topology, which changes dynamically depending on the configuration of a current device. When wireless communication is employed, an address in one system might be identical to one in another system, and as it is difficult to suppose a definite bus topology, the unique determination of a destination for a packet is not possible.

(2) Time limitation for a response—According to the USB specification, a device that receives a packet from a host or a function device is required to send a response within a 16-bit time period (1.33 $\mu$s when operating at full speed). However, as the wireless communication speed is in general less than the full speed of the USB, 12 Mbps, and as in many cases a collision avoidance mechanism is required, it is difficult to comply with the time requirement for the above bus turn around time.

(3) Frame synchronization—In order to synchronize with a USB frame of the computer, an SOF packet is issued every 1ms. The SOF packet must be transmitted at the start time of the frame precisely, but it is difficult to set a wireless transmission time so exactly due to changes in the environment. Furthermore, when the communication speed is low, the transmission of a synchronous packet every 1 ms imposes a great load on a communication channel.

(4) Control provided by the signal line state—Packets are not employed on the USB for port control functions, such as connection, disconnection, suspension, resumption, and reset, and the execution of port control functions are notified by static changes in signal line states. This method cannot be copied into wireless communication.

It is, therefore, one object of the present invention to provide a method for resolving the above wireless USB problems.

It is another object of the present invention to employ a wireless USB to remove a load imposed by the need to make a cable connection and to facilitate the disconnection and moving of devices.

It is an additional object of the present invention to extend a wireless USB and to provide a mechanism for enabling inter-host communication.

SUMMARY OF THE INVENTION

According to the present invention, a wireless hub connected to the USB bus in a computer side, and a wireless port connected to a USB interface of a peripheral device (generally, this is applicable to any device, and hereinafter such a unit will be referred to simply as a device), are provided and wireless communication is performed between the two. The wireless hub performs communication with the computer, and converts a USB packet routed to a device (a routing direction hereinafter sometimes called downstream) into a wireless signal, and a wireless signal received from a device into a USB packet. The wireless port attached to each device also converts a wireless signal into a USB packet and vice versa. While multiple wireless ports are usually connected to a single wireless hub, an arrangement of one wireless hub and a single wireless port is also possible. A wireless hub and a wireless port each have a device identifier (ID) uniquely assigned to them, and in the USB-wireless conversion, a destination specified by a USB address or bus topology, is converted into a device identifier.

A bidirectional buffer, for example, is provided in a wireless hub that, acting as a substitute, sends a response in accordance with the type of received packet and the state of a buffer. A USB packet received from the computer connected to the wireless hub is stored in the buffer, and is transmitted when the wireless medium can be used. A wireless port again converts the received wireless packet into a USB packet, and transmits it to a connected device. The response from the device is converted into a wireless packet, which is then transmitted to the wireless hub and is stored at the buffer therein. When the wireless hub is polled for the same contents by the computer, the wireless hub reads from the buffer the response that was received from the device, and transmits it to the USB bus. During a period at the wireless hub extending from the receipt of the first USB packet to the receipt of a wireless packet from downstream, all communication request (IN/OUT) transactions directed to the same destination are disregarded, and a NAK signal is returned to the computer indicating the device is not ready to perform processing. It should be noted, however, that SETUP transactions are constantly transmitted to the wireless link and ACK signals are returned to the computer. A time out in the USB can be avoided by using the above processing sequence.

The wireless hub periodically broadcasts a packet indicating the port states, and controls the operation of the wireless ports, while at the same time maintaining the frame synchronization in the wireless system. On the other hand, a wireless port for which there is a change in the device state, such as connect, disconnect, or remote wake-up, transmits to the wireless hub notification of the state change as the response to this packet. The length of a packet period is set long enough not to impose an excessive load on a communication channel and short enough not to affect port control. A variance of the transmission time is permitted within a specific period because of the need to coexist with a collision avoidance mechanism. To compensate for the uncertainty relative to the transmission time, a time shift from a scheduled transmission time is specified in a packet. A wireless port transmits a synchronous packet to a device based on its internal clock, and the cycle shift relative to the computer is adjusted by using the periodic packet. A port control command from the computer, such as reset or suspend, is transmitted from the wireless hub as a wireless packet, and the wireless port converts the command into a state change of a USB signal line. Notification of the USB signal line state is relayed by using the periodic packet and the wireless control packet.

In the system of the present invention, two power saving states are provided: a port power disconnected state and a state equivalent to a suspended state. When in the port power disconnected state, the wireless port receives one periodic packet every several transactions, while in the suspended state, the wireless port receives a periodic packet each transaction, and determines whether the wireless hub can be connected to the device or whether the state should be altered to the resumed state. During a period wherein the reception of periodic packets is not anticipated, a device in the power saving state halts the supply of power to all circuits, except for those required for synchronization. As a result, power control can be exercised by the computer and a power saving mechanism required for a portable device is achieved.

When a second wireless apparatus (typically connected to a peripheral device) establishes a connection with a first wireless apparatus communicating with a computer, steps are performed of: transmitting a connection request packet from the first wireless apparatus, including an identifier of the first wireless apparatus in response to receipt of a packet representing the connection with the first wireless apparatus; transmitting a predetermined packet (typically an ACK signal) in response to receipt of a connection permission packet including bus information (typically a port number) concerning a bus of the computer; and, employing the bus information to perform a setup (eg., correspondence of a port number with the identifier of the first wireless apparatus) in response to receipt of a packet that does not specify the second wireless apparatus as a destination. In this manner, after confirming that the communication process has been performed, the second wireless apparatus can identify a currently connected wireless apparatus.

Further, after the predetermined packet has been transmitted, and in response to receipt of a packet specifying the second wireless apparatus as a reception destination, the operation may be returned to the step of transmitting the connection request packet. This means that the first wireless apparatus could not receive the predetermined packet, and the connection process must be performed again.

When a first wireless apparatus communicating with a computer establishes a connection with a second wireless apparatus (typically connected to a peripheral device), steps are performed of: generating first bus information (typically a port number) concerning a bus of the computer for the second wireless apparatus in response to receipt of a connection request packet including an identifier of the second wireless apparatus from the second wireless apparatus; transmitting a connection permission packet including the first bus information to the second wireless apparatus; employing the identification data and the first bus information to perform a setup (e.g., registration of those) in response to receipt of a predetermined packet (typically an ACK signal) from the second wireless apparatus; and employing the second bus information to perform a setup (e.g., registration of the identifier and the first and second bus information) if the computer generates second bus information (a USB address in an embodiment) corresponding to the first bus information. As a result, data required for communication between the computer and the second wireless apparatus are correlatively registered.

In the above case, when a predetermined packet is not received within a predetermined period of time following transmission of the connection permission packet, a packet may be transmitted that designates as a destination the second wireless apparatus that transmitted the connection request packet. The final procedure is not performed even though the connection request packet was transmitted, because it is assumed that some problem has occurred. The second wireless apparatus is specifically designated as a destination in a packet sent to check the operating condition.

A periodic packet transmitted after the predetermined packet was received from the second wireless apparatus may not specify as a destination the second wireless apparatus that transmitted the connection request packet. This is because notification was dispatched to the second wireless apparatus that the first wireless apparatus could receive the predetermined packet.

When a first wireless apparatus communicating with a computer performs wireless communication with a second wireless apparatus communicating with a device (typically a peripheral device), steps are performed of: in response to a communication request with the device from the computer, transmitting a NAK signal, which indicates that the device is not ready to perform processing, to the computer within a response limit; and transmitting the communication request to the second wireless apparatus. As a result, a response limit defined by the bus of the computer can be coped with.

A step may be further performed of; in response to the same request as the communication request, successively transmitting the NAK signal to the computer within the response limit until a response is received from the second wireless apparatus. This is an effective means to evade the bus time out if transmission of multiple NAK signals is permitted.

Furthermore, if the communication request is for reading data from the device, steps may be performed of: transmitting a predetermined packet to the second wireless apparatus in response to receipt of data from the second wireless apparatus; and transmitting the received data to the computer in response to the same request as the communication request. Since the buffer is employed, the data extracted from the device can be output as a response to the same communication request as the preceding request.

If the communication request is a request for writing data to the device, data to be written can be transmitted with the communication request to the second wireless apparatus. If the communication request and the data to be written are contained in separate packets, there is a time lag in the wireless communication.

When a first wireless apparatus communicating with a device performs wireless communication with a second wireless apparatus, steps are performed of: transmitting a read request to the device in response to receipt of data reading request from the second wireless apparatus; returning a predetermined message (typically, an ACK signal) to the device in response to receipt of data from the device; and transmitting the data to the second wireless apparatus. Since the period for transmitting a predetermined packet is determined by the specification of a computer bus, the second wireless apparatus must send a response to the device in place of the computer.

When a state change is communicated to a second wireless apparatus from a first wireless apparatus communicating with a computer, steps are performed of: transmitting a suspend command to the second wireless apparatus in response to receipt of a suspend command from the computer; transmitting a periodic packet including a state bit that indicates the second wireless apparatus is in a suspended state, after the suspend command has been transmitted; and transmitting a periodic packet including a state bit representing the second wireless apparatus in an enabled state, in response to receipt of a resume command from the computer. Since the second wireless apparatus receives only a periodic packet once it has been moved to the suspended state, a packet other than the periodic packet cannot be employed to enable the second wireless apparatus. Therefore, the port state bit of the periodic packet is employed.

When a second wireless apparatus communicating with a first wireless apparatus performs a state change, steps are performed of: in response to receipt of a periodic packet including a state bit representing the state of the second wireless apparatus being disabled; determining whether or not a predetermined command was received from the first wireless apparatus before the periodic packet was received; and, changing the state of the second wireless apparatus to a state other than a connected state if the predetermined command is not received. In this case, an abnormality has occurred in the wireless communication, and when the state is returned to the powered-off state, the succeeding process will be more easily performed. The predetermined command can be a port suspend command or a disable command.

The wireless apparatus can be attached to the computer either externally or internally, and can also be either attached to a USB interface of the device, or mounted inside the device. When a first computer establishes a connection with a second computer in wireless communication, steps are performed of: activating a first device bridge (a DDB in the embodiment) having an interface for a bus of the first computer and a buffer for storing data concerning the wireless communication, in response to a command from the first computer; in response to receiving a packet representing permission of the connection by a device bridge from the second computer across the second wireless channel used by the second computer, transmitting across the second wireless channel to the second computer a connection request packet including data concerning a first wireless channel used by the first computer; in response to receipt of a connection permission packet across the first wireless channel from the second computer, transmitting a predetermined packet (typically, an ACK signal) across the second wireless channel to the second computer; transmitting across the first wireless channel a packet specifying a second device bridge in the second computer that includes an interface relative to a bus of the second computer and a buffer for storing data concerning the wireless communication; in response to receipt of a connection request packet across the first wireless channel from the second computer, transmitting a connection permission packet to the second computer across the first wireless channel; and in response to receipt of a predetermined packet across the first wireless channel from the second computer, employing the data concerning the second wireless channel and first bus information (a port number in the embodiment) concerning the bus of the first computer to perform a setup.

To establish a connection between hosts, the first and the second device bridges are provided, the connection establishment process described first is performed twice, and separate communication channels are employed. As a result, while communication between each host and its peripheral devices is enabled, communication between the hosts can also be performed. For example, when several persons having their portable computers gather, they can communicate with each other using their portable computers without altering the configuration of peripheral devices of the portable computers.

The first computer further performs a step of generating second bus information (a USB address in the embodiment) relative to the first device bridge. When a second computer establishes a connection with a first computer via wireless communication, steps are performed of: receiving a connection request packet including data concerning a first wireless channel used by the first computer, across a second wireless channel used by the second computer; activating a second device bridge (a DDB in the embodiment) including an interface for a bus of the second computer and a buffer for storing data concerning the wireless communication; transmitting a connection permission packet to the first computer across the second wireless channel; in response to receipt of a packet designating the second device bridge across the first wireless channel from the first computer, transmitting a connection request packet to the first computer through the first wireless channel; in response to receipt of a connection permission packet across the first wireless channel from the first computer, transmitting a predetermined packet (typically an ACK signal); and in response to receipt of a packet that does not designate the second device bridge across the first wireless channel from the first computer, employing data concerning the first wireless channel and third bus information concerning a bus of the second computer to perform a setup. The second computer further performs a step of generating fourth bus information (a USB address in the embodiment) relative to the second device bridge.

The processing for the present invention has been explained, and an apparatus for performing the processing can also be constructed that can serve as a wireless apparatus and can be connected to a computer, or incorporated in the computer body. Further, the processing can be performed by a program that in this case may be stored in a nonvolatile memory, such as a ROM, or on a storage medium, such as a floppy disk.

BRIEF DESCRIPTION OF THE DRAWINGS

The invention will now be described in greater detail with specific reference to the figures wherein.

DESCRIPTION OF THE PREFERRED EMBODIMENT

Figure 1:
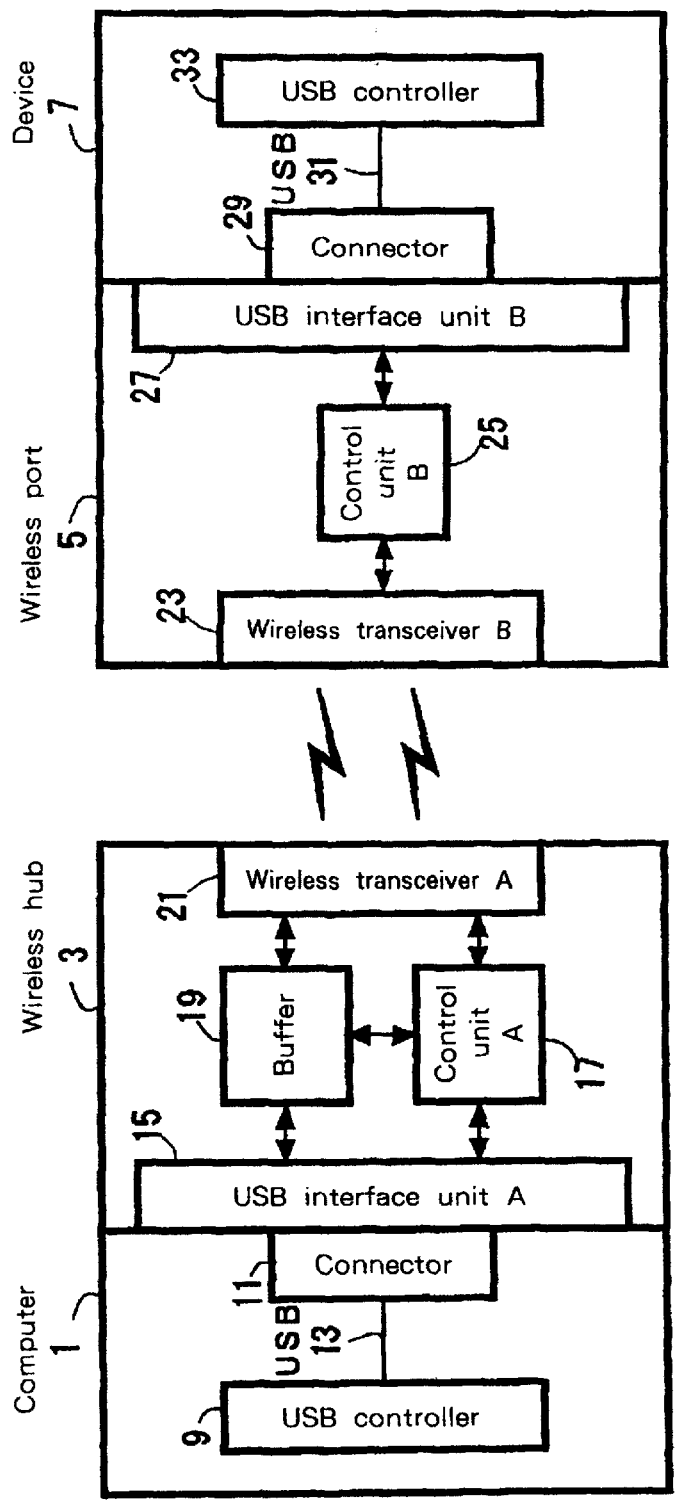
FIG. 1 is a block diagram illustrating one embodiment of the present invention.

FIG. 1 shows an example arrangement of an apparatus according to the present invention. A wireless hub 3 is connected to a computer 1 by a connector 11. A wireless port 5 is connected to a device 7 by a connector 29. The computer 1 includes a USB controller 9, which is connected to a USB 13. The USB 13 is connected to the connector 11. The wireless hub 3 includes a USB interface unit A (15), a buffer 19, a control unit A (17), and a wireless transceiver A (21). The USB interface unit A (15) is connected to the buffer 19 and the control unit A (17), and the wireless transceiver A (21) is also connected to the buffer 19 and the control unit A (17). The buffer 19 and the control unit A (17) are also connected together. The device 7 includes a USB controller 33, which is connected to the USB 31. The USB 31 is connected to the connector 29. The wireless port 5 includes a wireless transceiver B (23), a control unit B (25) and a USB interface unit B (27). The wireless transceiver B (23) is connected to the control unit B (25), which is connected to the USB interface unit B (27). Although it is not shown, the USB interface units A and B are connected to connectors. Further, while only one wireless port is shown in FIG. 1, a plurality of wireless ports may be provided.

A CPU (not shown) in the computer 1 controls the USB controller 9 to transmit USB packets to the USB 13. The USB interface unit A (15) in the wireless hub 3 receives the USB packets and transmits the contents of the USB packets to the control unit A (17). The USB interface unit A (15) stores data in the buffer 19, as needed. When the control unit A (17) receives the contents of a USB packet from the USB interface unit A (15), the control unit A (17) controls a transmitter in the wireless transceiver A (21), and transmits a wireless packet to the wireless port 5. A receiver in the wireless transceiver B (23) receives wireless packets, converts them into electric signals, and transmits the signals to the control unit B (25). The control unit B (25) transmits the received contents to the USB interface unit B (27), which then converts them into USB packets and transmits them to the USB 31. In response to a USB signal, the USB controller 33 performs a necessary process.

When read command is output by the computer 1, for example, the USB controller 33 outputs a USB packet including necessary data to the USB 31, and the USB interface unit B (27) receives the USB packet. The control unit B (25) controls the wireless transceiver B (23) so that a wireless packet transmitted by its transmitter has an appropriate form. The control unit B (25) serves as a substitute for transmitting a response, which will be described later, and instructs the USB interface unit B (27) to output an ACK for the USB packet. When a receiver in the wireless transceiver A (21) receives a wireless packet including data transmitted by the device 7, the receiver notifies the control unit A (17) of the receipt of the data, and stores the data in the buffer 19. The control unit A (17) is notified by the USB interface unit A (15) that a data reading command which has the same destination has been received from the USB controller 9, and transmits the address of the data in the buffer 19 to the USB interface unit A (15). The USB interface unit A (15) reads the data at the address, and outputs the data as a USB packet to the USB 31.

The outline of the arrangement in FIG. 1 has been explained, and the processing required for a wireless USB will now be explained referring to the components in FIG. 1.

(A) Wireless Communication System

Wireless USB protocol does not depend on a specific modulation system. For example, a radio communication by direct sequence spread spectrum technique can be employed. Several channels can be acquired using a CDMA method by sliding a spread code.

| | |
|---|---|
| Frequency: | 2484 Mhz |
| Band width: | 26 MHz |
| Modulation type: | π/4 shift QPSK |
| Spread type: | Direct spreading |
| Spread symbol: | 11 bit barker type |
| Baseband signal speed: | 2 Mbps |
| Spreading modulation speed: | 11 Mbaud |

The foregoing are merely examples.

(B) Wireless Packet Structure

Figure 2:
FIG. 2 is a diagram illustrating an example structure of a wireless packet.

A wireless packet is arranged as shown in FIG. 2. In accordance with a command from the control unit, a appropriate type of wireless packet is prepared by the transmitter of the wireless transceiver and is output. The packet starts from the left in FIG. 2. In FIG. 2, R denotes a transition ramp time; SOP, a start of packet symbol; BS, a bit synchronization signal; UW, a synchronous word; XID, a transmission source ID; RID, a transmission destination ID; PT, a packet type; DATA, the contents of transmitted data; CRC, a cyclic redundancy check which covers from XID to DATA; and EOP, an end of packet symbol.

The packet types PT are as follows:

(a) Standard packet—This type of packet is employed to transmit all the USB packets generated by a device and an IN token (read command) from the computer 1. Bits representing a packet as a standard packet are set to the packet type PT, and all the bits in the USB packet, beginning with PID to immediately before EOP, are encapsulated in the DATA.

(b) Composite packet—A composite packet is a wireless packet employed when an OUT or a SETUP token (a write or setup command) in the USB and subsequent data are transmitted at one time. Bits representing a packet as a composite packet are set to the packet type PT, and an OUT or a SETUP token and a USB data packet are included in the DATA.

(c) ACK packet—An ACK packet is transmitted when a wireless packet has been received correctly. The ACK packet is employed when the wireless port 5 receives a wireless control packet, when the wireless hub 3 receives a control data packet, or when the wireless hub 3 receives a data packet sent in response to an IN token. The ACK packet does not include the DATA field.

(d) NAK packet—A NAK packet is transmitted when the wireless port 5 is not ready to perform processing even though a wireless packet has been received. The NAK packet does not include the DATA field.

(e) Periodic packet—A periodic packet is employed for connection of a device, control of the port state, and adjustment of a USB frame period. Delay time, device type and port state are included in the DATA field. The delay time represents a delay from a scheduled transmission time of a periodic packet. The device type is used to identify the connectable device type. The device types are a low-speed device, a full-speed device, a hub, an inter-host communication virtual device and a device group. Devices can be registered as a group, and when only the devices of a certain group are to be connected, that group is specified. The port state field is a bit map wherein for each port, a value of "1" is set when the port is enabled, and a value of "0" is set in all other cases (suspended, disabled, disconnected, or powered off). The port state bit is arranged in numerical order consonant with the numbers of the ports. It should be noted that bit 0 is used to describe the state of the wireless hub 3. It is possible to provide a unit in the control unit A (17) of the wireless hub 3 to perform the processing required for the transmission of a periodic packet, and to periodically prepare the DATA field. The DATA is broadcasted by the transmitter of the wireless transceiver A (21).

(f) Connection request packet—A connection request packet is used to request a connection with the wireless hub 3, and is transmitted as a response of a periodic packet. The type of device connected to the port is written in the DATA.

(g) Connection approval packet (Connection permission packet)—A connection approval packet is used when the wireless hub 3 approves a connection of a device, and is transmitted in response to a connection request packet. The logical port number in the wireless hub 3 is written in the DATA. The port number is equivalent to the port number of the USB.

(h) Port state change packet—A port state change packet is employed to notify the wireless hub 3 of the alternation of hardware port states, and is transmitted in response to a periodic packet. The DATA reflects changes in port states, such as those related to connection status, port invalidation, suspension, overcurrent, completion of reset or remote wake-up.

(i) Wireless control packet—A wireless control packet is used to transmit a control command from the wireless hub 3 to the wireless port 5. The control command is included in the DATA field.

(j) Control data packet—A control data packet is used to transmit control data from the device 7 that has been requested in the control command. The control data is included in the DATA.

(C) Interference/collision Avoidance Process

A specific interference/collision avoidance process is performed for wireless communication. In this embodiment, the wireless hub 3 or the wireless port 5 examines an assigned identifier to specify the identity of a packet sender or recipient, and prevents the reception of a packet originating in another system. For packet collision avoidance, the CSMA/CA method is employed for each transaction. In this embodiment, the wireless transceiver and the control unit cooperate and together perform the following processing.

1. Step 1

The control unit A (17) of the wireless hub 3, before initiating a new packet transaction, always makes the wireless transceiver A (21) confirm the absence or presence of a wireless carrier. When a wireless carrier exists, the control unit A (17) waits until its communication is terminated.

2. Step 2

When the absence of a wireless carrier is confirmed, the control unit A (17) of the wireless hub 3 activates a timer and makes the wireless transceiver A (21) monitor the wireless carrier for a period consisting of several time slots with the length of a unit back-off time. The number of slots is a random integer within a maximum back-off count. The maximum back-off is controlled in accordance with the communication condition, while the initial value is, for example, set to 8. When, at step 1, the maximum back-off period or longer has elapsed since the disappearance of a preceding carrier, the monitoring of a carrier at this step is not required.

3. Step 3

When the absence of a new carrier is confirmed at step 2, the wireless hub 3 (the wireless transceiver A (21)) begins transmission of a wireless packet.

4. Step 4

When the wireless port 5 (the wireless transceiver B (23)) has normally received the wireless packet and confirms the end of packet via end symbol EOP followed by the carrier disappearance, the wireless port 5 begins to transmit a response within the wireless turn-around time.

5. Step 5

The wireless port 5 (the wireless transceiver B (23)) continues transmission of the bit synchronization pattern until the contents of the response are determined. When the wireless packet to be transmitted is ready, the wireless port 5 begins to transmit a synchronous word UW.

6. Step 6

When the wireless hub 3 does not receive a response within the turn-around time after the completion of the wireless packet transmission, the wireless hub 3 transmits the wireless packet again. When no response is received, for example, after three wireless packet transmissions, the wireless hub 3 performs a disconnection process, which will be described later.

(D) Connection Process

Figure 3:
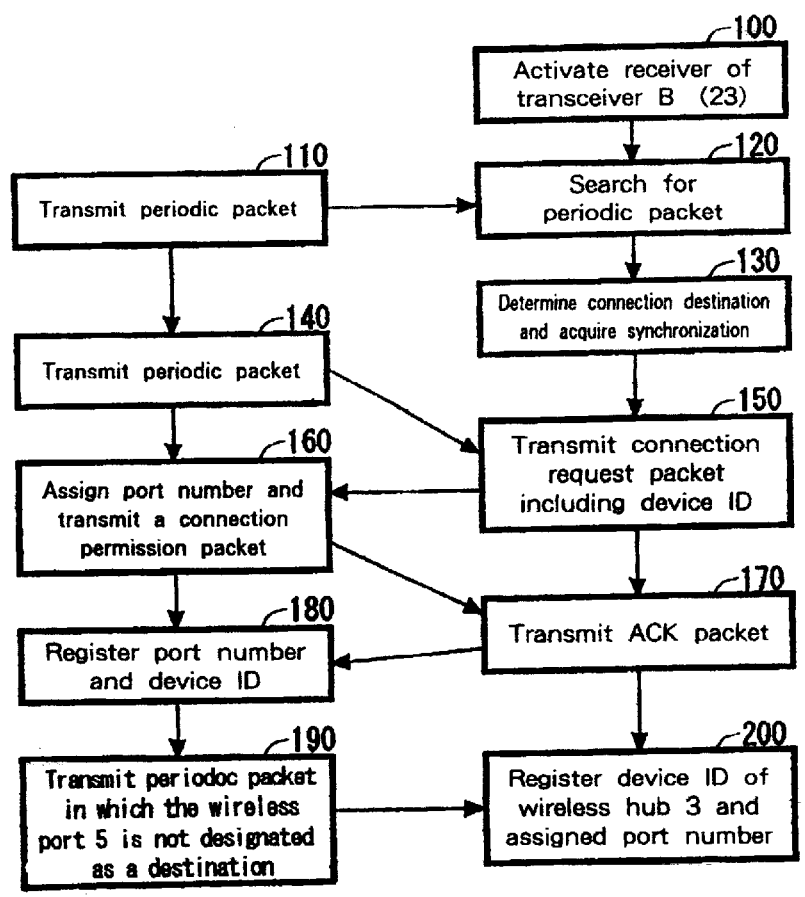
FIG. 3 is a flowchart for the processing performed when a wireless hub 3 and a wireless port 5 are connected.

The connection of the wireless port 5 with the wireless hub 3 is performed as follows. It is assumed here that the wireless hub 3 is already operating while the wireless port 5 is powered off. First, the wireless port 5, which is powered on, activates the receiver of the wireless transceiver B (23) if the wireless port 5 recognizes the connection of the device 7 (step 100 in FIG. 3). Control unit B (25) makes the USB interface unit B (27) check whether the device 7 is connected. When the connection of the device 7 is confirmed, the control unit B (25) activates the receiver. The control unit B (25) searches all the channels for a periodic packet that was transmitted by the wireless hub 3 at step 110 (step 120). The periodic packet transmitted by the wireless hub 3 designates a device to be connected by using the receiver ID (RID) and the device type included in the DATA. When no specific device is designated, the RID is 0, for example. As a result of the search, the wireless hub 3 to be connected is determined based on the following priority order, for example, and synchronization with the wireless hub 3 is acquired.

(a) The wireless hub which has the greatest signal strength and that transmitted periodic packets with the RIDs identical to the device ID of the wireless port 5.

(b) The wireless hub which has the greatest wireless strength and that transmitted periodic packets indicating that the device 7 can be attached.

(c) The wireless hub which has the greatest signal strength and that transmitted periodic packets indicating that the device 7 cannot be attached.

The receiver of the wireless transceiver B (23) notifies the control unit B (25) of the contents of a received periodic packet and its signal strength, and the control unit B (25) determines to which wireless hub it is to be connected. Then, the control unit B (25) instructs the wireless transceiver B (23) to synchronize its activities with the transmission of periodic packet of the wireless hub.

If, at step 120, a periodic packet is not detected, the search is continued. When a wireless hub 3 to be connected is determined and synchronization is acquired, the wireless port 5 receives only the periodic packets and shifts to a power saving mode. Thereafter, a transmission originating from another wireless hub is completely ignored. To save power consumption, the wireless port need not monitor each periodic packet that is received, but once in several times.

When a periodic packet (step 140) indicates that the device 7 can be attached to the wireless hub 3 after synchronization has been achieved, the wireless port 5 transmits a connection request packet to the wireless hub 3 (step 150). The connection request packet includes a device ID. The control unit B (25) is informed of a notice concerning the contents of the periodic packet from the wireless transceiver B (23), and instructs the transmission of the connection request packet. When the wireless hub 3 receives the connection request packet from the wireless port 5, the wireless hub 3 assigns a port number to the wireless port 5, and transmits a connection permission packet in which the port number is included (step 160). Since the wireless hub 3 has to manage addresses for multiple wireless ports to be connected, an address management unit may be included in the control unit A (17). An address management unit may, for example, assign a port number to a device (a device ID), and hold it temporarily. Upon reception of the connection permission packet, the wireless port 5 transmits an ACK packet to the wireless hub 3 (step 170). Transmission of packets at steps 150, 160 and 170 must be performed within the predetermined wireless turn-around time.

The wireless port 5, which received the connection permission packet, holds the device ID of the wireless hub 3 and of the port number assigned to the wireless port 5. At this time, the device ID and the port number have not yet been registered because an ACK packet might not be received by the wireless hub 3. On the other hand, the wireless hub 3, which received the ACK packet from the wireless port 5, makes the address management unit register the device ID and the port number in a table. The table may be provided in the buffer 19 or in the control unit A (17). When the wireless hub 3 does not receive the ACK packet, it is assumed that approval of the connection has not been granted. Thereafter, a wireless port that transmitted a connection request packet is designated in the RIDs of succeeding three periodic packets, for example.

When an ACK packet is received, the RID of the next periodic packet must not be that of the wireless port which transmitted the ACK packet (step 190). That is, either another wireless port is designated as a transmission destination, or no specific device is designated. When the wireless port 5 receives such a periodic packet, it registers the device ID of the wireless hub 3 and the port number assigned to the wireless port 5 (step 200). The receipt of such a periodic packet is a confirmation that the ACK packet has been received by the wireless hub 3, and the connection procedure is completed.

When the ACK packet is transmitted and thereafter the periodic packet is received in which the wireless port 5 has assigned itself as a transmission destination, it is assumed that the wireless hub 3 has not received the ACK packet and the connection procedure failed. Program control then returns to step 150.

Figure 4:
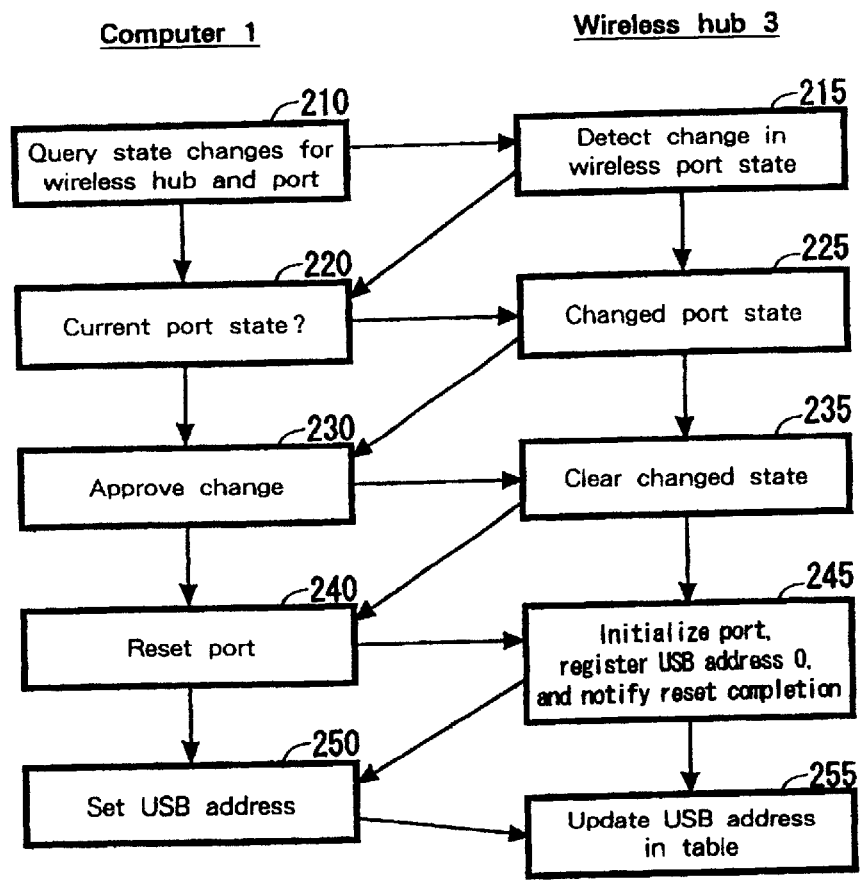
FIG. 4 is a flowchart for the communication performed between the wireless hub 3 and a computer 1.

The wireless hub 3 and the wireless port 5 are connected together, but the presence of the wireless port 5 is not acknowledged by the computer 1. Therefore, the process in FIG. 4 is performed after the process in FIG. 3. Specifically, the USB controller 9 of the computer 1 periodically queries the wireless hub 3 regarding changes in the states of the wireless hub 3 and the wireless ports (step 210). When there is a new entry in the table for the port numbers and device IDs, the USB interface unit A (15) returns a message to the effect that a change has been made (step 220). Upon reception of the message, the computer 1 queries the wireless hub 3 regarding the current port state (step 225). In response to this, the USB unit A (15) of the wireless hub 3 returns to the computer 1 the current port state and the change that was effected. The USB controller 9, when approving the change, transmits the acknowledgement to the wireless hub 3 (step 230). The acknowledgement of the change is transmitted through the USB interface unit A (15) to the control unit A (17), which clears the state that indicates a change has been made. The USB interface unit A (15) sends a notification of the clearance to the computer 1 (step 235). Then, the USB controller 9 of the computer 1 instructs the resetting of the wireless port to which the change pertains (step 240). In response to the port reset instruction, the control unit A (17) of the USB interface unit A (15) instructs initialization of the port. Following this, a USB address 0 corresponding to the port number of the wireless port and the device ID to which the change pertains is registered in the table. When the port has been reset, the control unit A (17) sends a notification of the completion of the reset to the USB interface unit A (15), and the USB interface unit A (15) transmits a reset end notice to the computer 1 (step 245). Upon reception of the notice, the USB controller 9 of the computer 1 assigns a USB address and transmits it to the wireless hub 3 (step 250). Upon reception of the USB address, the USB interface unit A (15) transmits it to the control unit A (17), and the control unit A (17) replaces the USB address 0 in the table with the received USB address (step 255). As a result, the correspondence among the USB address, the port number and the device ID are composed.

(E) Transmission and Reception of a USB Packet

Figure 5:
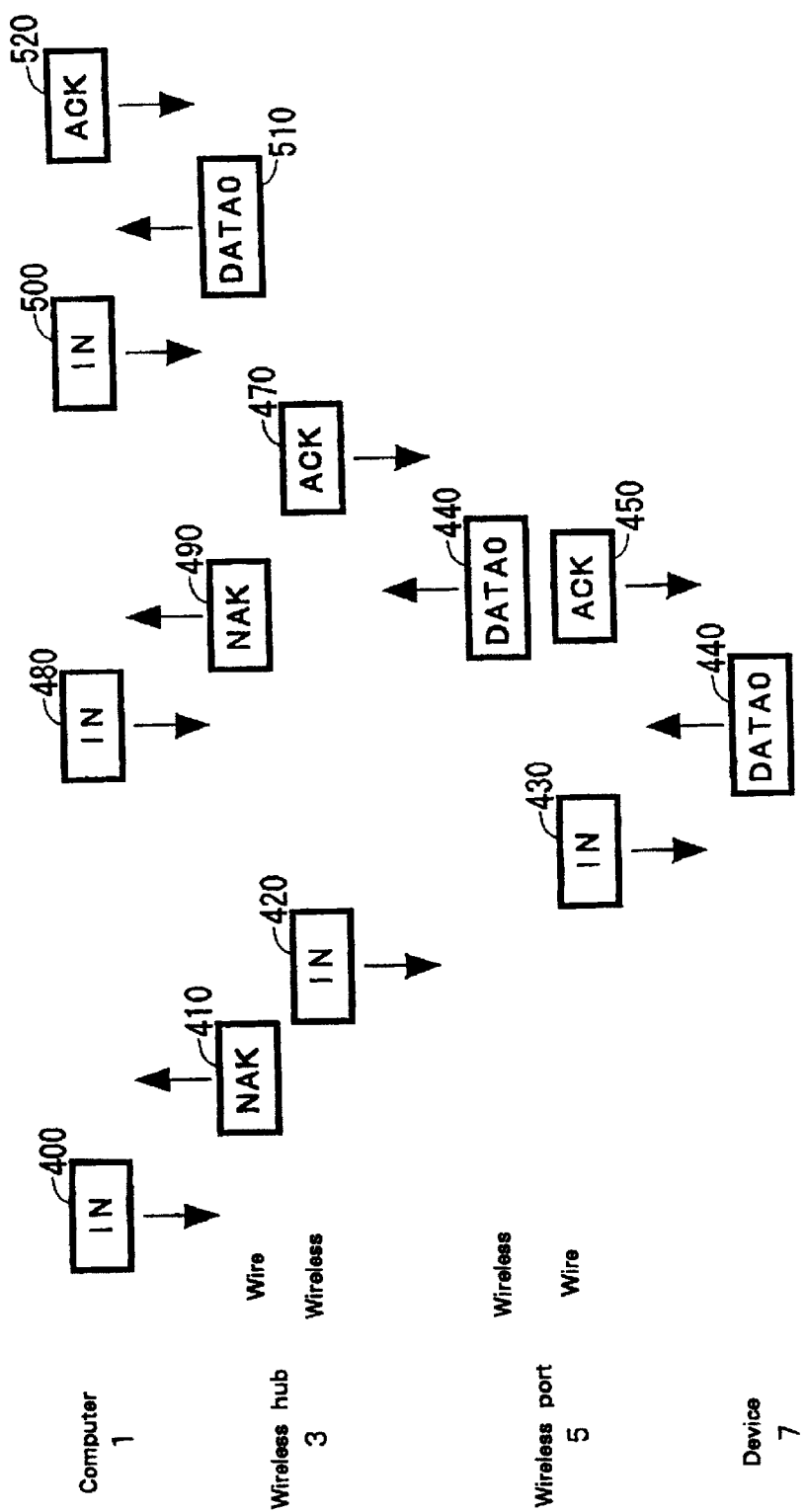
FIG. 5 is a diagram showing the movements of packets during wireless communication.

Since a data transfer rate and frame synchronization are not absolutely ensured in the wireless USB, only control transfers, bulk transfers and interrupt transfers, which are specified by the USB, are supported. A process performed when, for example, an IN token is received from the computer 1 will be explained referring to FIG. 5. First, the USB controller 9 of the computer 1 transmits an IN token 400 to the USB interface unit A (15) of the wireless hub 3. The USB interface unit A (15) notifies the control unit A (17) of the type of the USB packet that has been received, and stores the USB packet 400 in the buffer 19. The USB interface unit A (15) returns a NAK packet 410 (USB packet) to the USB controller 9. This is done because, since they have a wireless connection, data cannot be returned immediately. The control unit A (17) confirms that the received USB packet is a read instruction and identifies a destination device, and then instructs the wireless transceiver A (21) to transmit to the destination device a standard wireless packet 420 including the IN token from the USB packet. The transmission of the standard packet 420 is performed when a wireless medium is ready for use.

After the wireless transceiver B (23) of the wireless port 5 receives the standard packet 420, it transmits it to the control unit B (25). The control unit B (25) instructs the USB interface unit B (27) to construct an IN token 430. The USB interface unit B (27) then outputs the USB packet 430 to the USB controller 31 of the device 7. The device 7 returns a USB packet 440 including data DATA0 to the USB interface unit B (27) of the wireless port 5. The USB interface unit B (27) returns an ACK packet 450 to the device 7 to avoid a time out. Furthermore, the USB interface unit B (27) transmits the received USB packet 440 to the control unit B (25). The control unit B (25) instructs the wireless transceiver B (23) to transmit a standard wireless packet 460. It should be noted that when no response is received from the device 7 within the USB bus turn around time following the output of the IN token 430, an empty standard packet is transmitted. The wireless transceiver A (21) of the wireless hub 3 receives the standard packet 460 from the wireless port 5, and transmits an ACK packet 470 to the wireless port 5. The wireless transceiver A (21) also notifies the control unit A (17) of the receipt of the standard packet 460, and stores the contents of the packet 460 in the buffer 19.

Even when, during a period extending from the transmission of the standard packet 420 to the transmission of the ACK packet 470, an IN token 480 having the same destination is transmitted by the USB controller 9 of the computer 1, the wireless hub 3 returns only a NAK packet 490 to the USB controller 9. This occurs because the wireless hub 3 has transmitted the NAK packet 490 once already and the traffic congestion along a communication channel may be worsened by the transmission of additional wireless packets. Therefore, the control unit A (17) of the wireless hub 3 must manage for individual wireless ports the packet types that have been transmitted to it.

When an IN token 500 having the same destination is received again after the ACK packet 470 has been output, the control unit A (17) communicates the address in the buffer 19 to the USB interface unit A (15). The USB interface unit (15) reads a USB packet 510 from the buffer 19, and outputs it to the USB controller 9. In response to this, the USB controller 9 returns an ACK packet 520.

For transmission of an OUT token, the wireless hub 3 receives a USB packet including data to be written, and transmits a wireless composite packet to the wireless port 5. The wireless hub 3 returns the NAK packet in the same manner as in the previous process. When an OUT token having the same destination is transmitted from the computer 1 after the ACK packet has been received from the wireless prot 5, the wireless hub 3 returns an ACK packet.

In addition, the wireless hub 3 cannot return a NAK packet in response to the receipt of a SETUP token. Therefore, the wireless hub 3 returns an ACK packet to the computer 1, and for each receipt of the SETUP token, transmits it as new communication data to the wireless port 5.

(F) Buffer

While the response using the NAK packet is permitted for IN/OUT transactions in the USB, an ACK packet must be returned for the SETUP transaction. It is preferable, therefore, that independent buffers be employed for the SETUP transaction and for the IN/OUT transactions. The buffer 19 is constituted by two buffers.

Since NAK responses are allowed, the buffer for the IN/OUT transactions must be equipped with only one entry for each direction, to the computer 1 and to the wireless port 5. One buffer requires a total of 68 bytes for the maximum packet length of 67 byte and for a port number. Actually, based on this unit, the buffer size is determined while taking into account manufacturing costs and communication efficiency. Since an ACK packet must be returned in the SETUP transaction, a downstream FIFO buffer is employed. For each buffer entry 15 bytes are required for a token (3 bytes), data (11 bytes) and a port number (1 byte). The number of entries required to guarantee the wireless transmission of all the SETUP packets sums up to the following: port count× control end point count. It should be noted, however, that buffer entries of about twice the port count are adequate when the number of endpoints in a device and the ratio of the SETUP transactions to the total communication quantities are taken into account. When the SETUP buffer is full, the wireless hub 3 does not return the ACK and lets the computer 1 assume that a transaction error has occurred.

(G) State Change

The processing for state changes of suspended, resumed and disconnected states will now be described.

Figure 6:
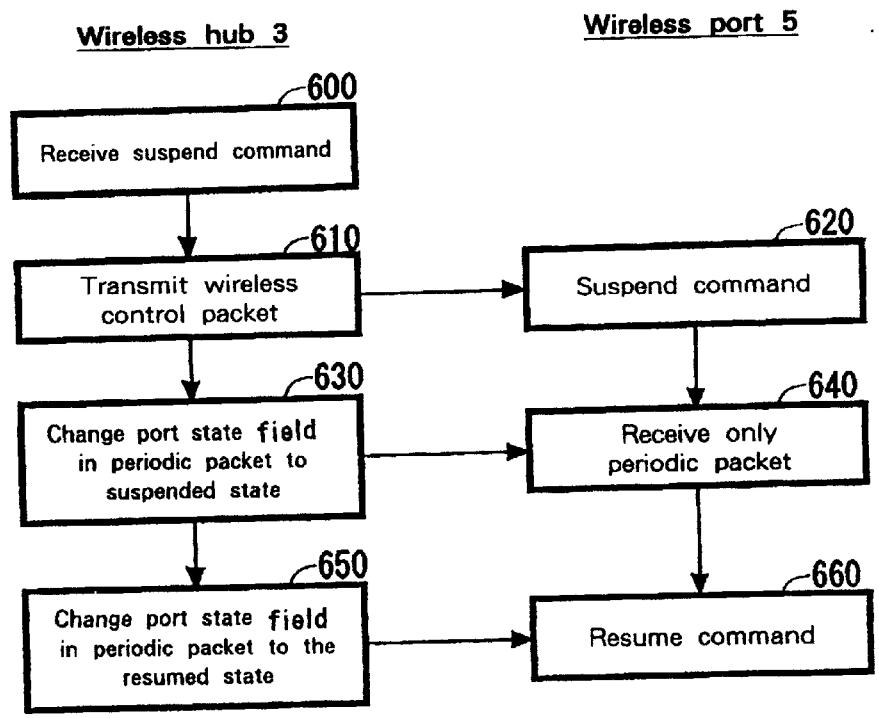
FIG. 6 is a flowchart for suspension/resumption processing.
Figure 7:
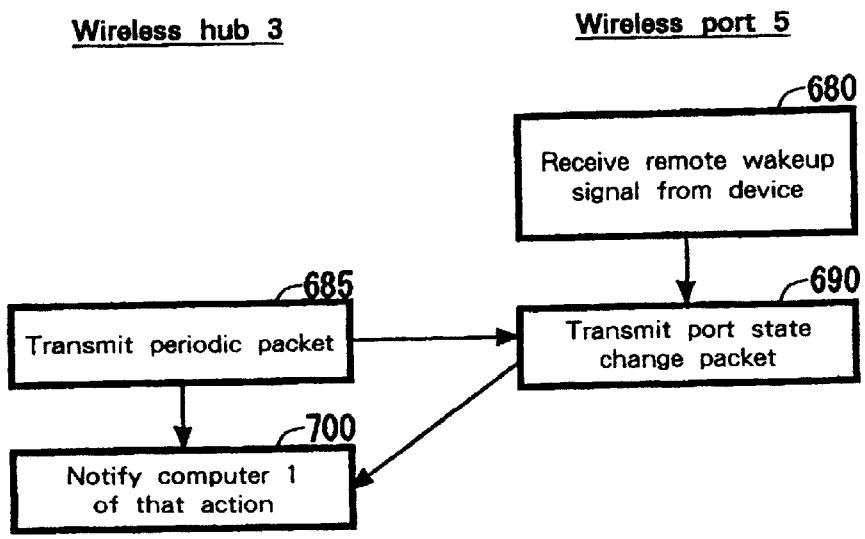
FIG. 7 is a flowchart for the suspension/resumption processing.

(1) Suspended and resumed state—The state change is transmitted as a change in the state of the USB signal line from the USB controller 9 of the computer 1 to the wireless hub 3. The destination of a wireless packet differs according to the cases where all the ports connected to the wireless hub 3 are suspended and where an individual port is suspended. The USB interface unit A (15) detects a change in the state of a signal line, and transmits it as a suspend command to the control unit A (17) (step 600 in FIG. 6). The control unit A (17) sends a command to the wireless transceiver A (21) to transmit a wireless control packet for instructing a suspension (step 610). Upon reception of the wireless control packet, the wireless transceiver B (23) passes the packet to the control unit B (25), which instructs the USB interface unit B (27) to shift the signal line state to the suspended state (step 620). In this manner, the suspend command is transmitted to the device 7.

Following this, the wireless hub 3 employs the bit map of the port state field of the periodic packet to indicate that the wireless port is in the suspended state (step 630), so that the wireless port 5 receives only a periodic packet (step 640). Since in the suspended state the wireless port 5 receives only a periodic packet, the wireless port state field in the periodic packet is changed to reflect a resumed state so that the computer 1 resumes the wireless port 5 (step 650). Upon reception of this periodic packet, the control unit B (25) of the wireless port 5 instructs the USB interface unit B (27) to change the signal line state in order to indicate resumption for a minimum of 20 ms (step 660). Therefore, the device 7 connected to the wireless port 5 is resumed.

When a device, such as a modem, is used as a device 7, a remote wakeup may occur. When the USB interface unit B (27) receives a remote wakeup signal from the USB controller 33 of the device 7, the USB interface unit B (27) changes the signal line state so as to also indicate resumption for at least 20 ms (step 680). Upon reception of a next periodic packet from the wireless hub 3 (step 685), the USB interface unit B (27) transmits a port state change packet indicating the resumed state (step 690). When the port state change packet is received, the wireless hub 3 instructs the USB interface unit A (15) to transmit a message to that effect from the control unit A (17) to the computer 1 (step 700).

When the periodic packet reflecting the change of the state to the resumed state is transmitted, for example, three times, the wireless hub 3 assumes that the operation of the pertinent wireless port has been resumed, and sends a response to that effect to the computer 1. The wireless port 5, therefore, may receive a standard wireless packet, including an IN token, from the wireless hub 3. If at this time the resumption process has not yet been completed, the wireless port 5 returns a wireless NAK packet to the wireless hub 3.

(2) Disconnection-(a) When the wireless port 5 detects that the device 7 connected to the wireless port 5 has been disconnected, in response to a periodic packet, the wireless port 5 transmits the port state change packet to the wireless hub 3 to notify it of the disconnection, and moves the state to the powered-off state. The wireless hub 3 transmits the port state change to the computer 1.

b) The same process is performed when a user has reset the wireless port 5.

c) When the USB controller 9 of the computer 1 requests that the power supply to a wireless port be halted, the wireless hub 3 transmits a wireless control packet to the pertinent wireless port. After an ACK packet is received from the wireless port, or after a time out, the port state is changed to the disconnected state. When the wireless port 5 receives the wireless control packet instructing the disconnection, it transmits an ACK packet to the wireless hub 3, and erases its internal registration of the wireless hub.

d) When, for example, three communication errors occur during one wireless transaction, the wireless hub 3 disconnects the wireless port 5 and the disconnection is reflected in the port state field of the periodic packet.

e) When the wireless port 5 fails to detect periodic packets three times in a row, the wireless port 5 assumes that the link with the wireless hub 3 has disrupted, and shifts to the powered-off state. When the wireless port 5 is in the suspended state or the disabled state, an incomplete synchronization may cause the loss of periodic packets. In such a cases, the port should be monitoring all the wireless packets for a certain time period, for example, equivalent to three periodic packet cycles, in order to again acquire synchronization. If a periodic packet can still not be detected, the above described process is performed.

f) When the port state in the periodic packet is changed to the disabled state, normally, the wireless hub 3 has already received a wireless control packet that corresponds to a port suspend command or a port disable command. If such a command has not yet been received, it is assumed that the wireless port 5 has been disconnected from the wireless hub 3 because of a transaction failure. Thereafter, the registration of the wireless hub 3 is erased, and the wireless port 5 is changed to the powered-off state.

Inter-host Communication

Figure 8:
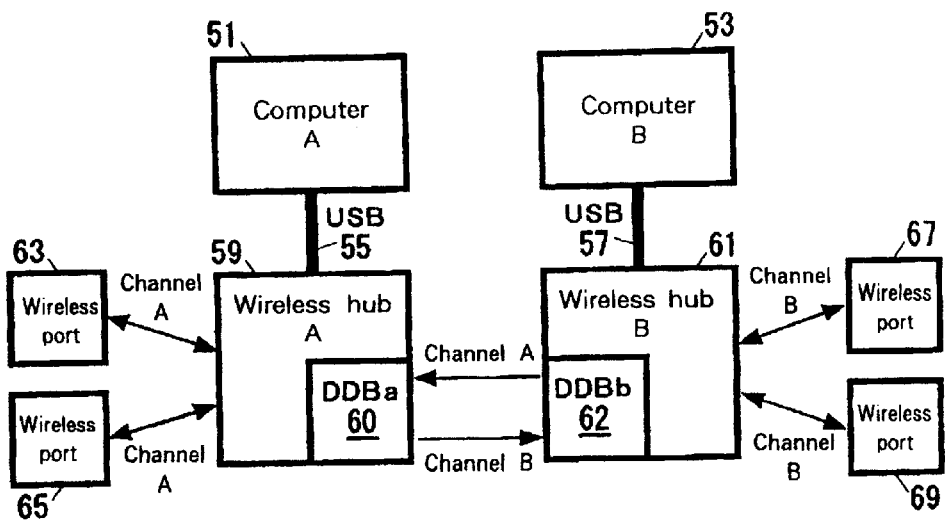
FIG. 8 is a functional block diagram for computers A and B for inter-host communication.

An inter-host communication procedure will now be explained while referring to FIGS. 8 to 11. FIG. 8 is a block diagram illustrating the configuration when a computer A (51) communicates with a computer B (53). The computer A (51) is connected to a wireless hub A (59) by a USB 55. The wireless hub A (59), employing the above described method, is in wireless communication with a wireless port 63 and a wireless port 65. A wireless channel A is employed for communication with the wireless port 63 and the wireless port 65. When an application at the computer A (51) issues a connection establishment command to initiate communication with the computer B (53), the wireless hub A (59) logically generates and activates a DDBa (Device-Device Bridge-a) 60 that will be described in detail later. The computer B (53) is connected to a wireless hub B (61) by a USB 57. The wireless hub B (61) communicates with a wireless port 67 and a wireless port 69 across a wireless channel B. The wireless hub B (61) logically generates and activates a DDBb (Device-Device Bridge-b) 62 in order to communicate with the wireless hub A (59). The DDBb 62, which functions the same as the DDBa 60, will also be described in detail later. The DDBa 60 and the DDBb 62 provide means for communication between the computer A (51) and the computer B (53). A wireless channel B is employed for transmission from the DDBa 60 to the DDBb 62, and a wireless channel A is employed for wireless transmissions in the other direction.

Since the procedures specified in the USB control only the communication between a host and a peripheral device, a communication method whereby a peripheral device responds to polling by the host is employed. Therefore, it is impossible for hosts to communicate with each other equally over the USB. And it is not preferable that a specific host serves as a peripheral device for another host, because connections with peripheral devices of the specific host will be abandoned. Therefore, the DDBa and the DDBb are provided in each host (a wireless hub in this embodiment), and serve as virtual peripheral devices. Inter-host communication can be established by initiating wireless communication between the DDBa 60 and the DDBb 62. Since the DDBa 60 and the DDBb 62 are provided for communication between the computer A and the computer B, another pair of DDBs is needed for communication with another computer. In this embodiment, the wireless hub logically generates and activates a DDB; however, the control unit A (17) in FIG. 1 may emulate a DDB, or an adequate number of hardware DDBs may be provided. Furthermore, since a wireless channel is separated as shown in FIG. 8, not only the inter-host communication but also the aforementioned communication between the host and the peripheral device can be performed at the same time.

Figure 9:
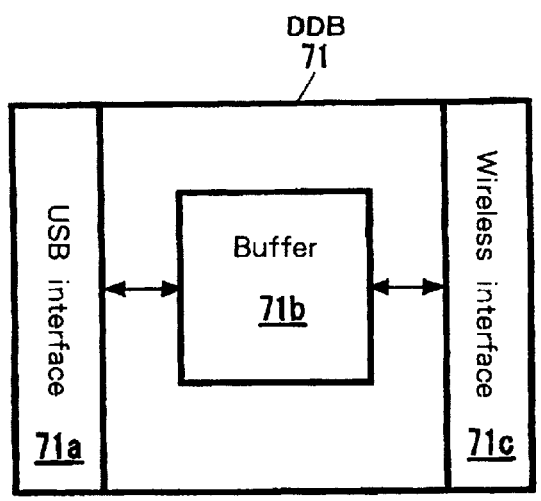
FIG. 9 is a functional block diagram illustrating a DDB.

FIG. 9 is a functional block diagram illustrating a DDB 71. Since, from the viewpoint of the computer, the DDB 71 functions as a peripheral device for the USB, the DDB 71 has a USB interface 71*a* that is adjacent to the computer. The USB interface 71*a* responds to polling from the computer in accordance with the USB protocol. In addition, the DDB 71 includes a wireless interface 71*c* to communicate with the wireless transceiver A (21) in the wireless hub 3 in FIG. 1. A buffer 71*b* is also required to store data during a period extending from the time data is received from the computer until the data is transmitted as a wireless signal by the wireless transceiver A (21), or during a period that continues until the signal received by the transceiver A (21) is transmitted in response to polling by the computer. Any data structure can be employed for the buffer 71*b*, and the buffer 71*b* may be divided into a portion for transmissions from the USB interface 71*a* to the wireless interface 71*c*, and a portion for transmissions in the other direction. In this embodiment, since the DDB is a logical device using the control unit A (17), the buffer 71*c* is one portion of the buffer 19.

Figure 10:
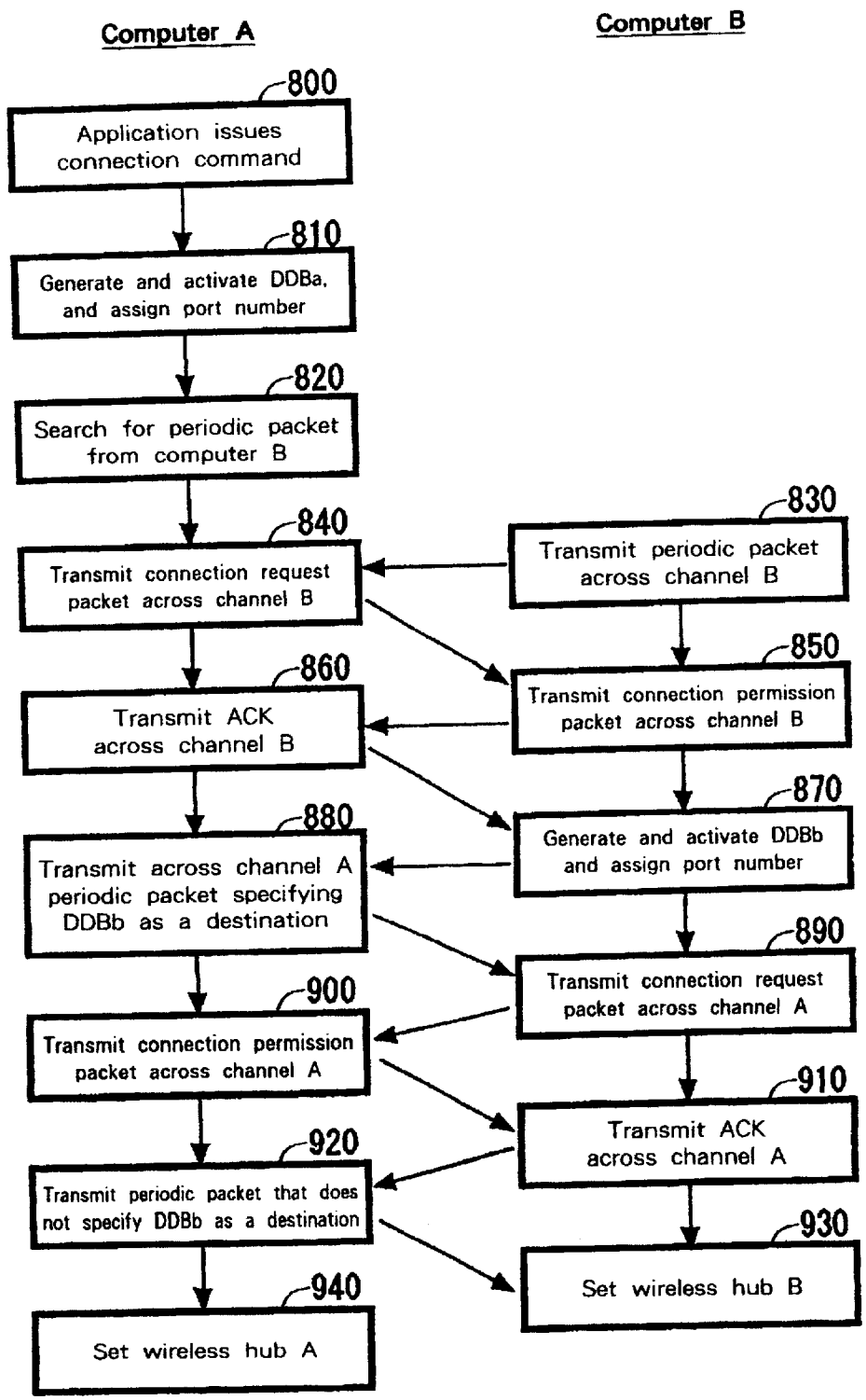
FIG. 10 is a flowchart for connection establishment processing for inter-host communication.

Next, an operation for establishing the connection between the computer A (51) and the computer B (53) will be described referring to FIG. 10. In this embodiment, the process is shown when an application in the computer A (51) has issued a connection command (step 800). When the connection command is issued, the wireless hub A (59) generates and activates the DDBa 60, and assigns a port number to the DDBa 60 (step 810). The DDBa 60 normally has the same device ID as the wireless hub A (59), but it may be assigned a different ID. The wireless hub A (59) examines all the wireless channels for a packet transmitted from the wireless hub B (61). When a packet from the wireless hub B (61) is found, the wireless hub A (59) monitors the wireless channel B, at a time other than the time at which a periodic packet of the wireless hub A (59) is transmitted, and waits for the reception of a periodic packet (step 820). If the periodic packet has not been received from the wireless hub B (61) by the time three or more periods have been monitored, the wireless hub A (59) delays the timing for the next transmission of a periodic packet to its own system by a length of time equivalent to ½ the length of a wireless frame. Before this process, the wireless hub A (59) renders all the wireless ports active, and issues a wireless control command to notify other components of the change in the transmission timing.

When the wireless hub A (59) receives a periodic packet from the wireless hub B (61) across the wireless channel B (step 830), the wireless hub A (59) transmits a connection request packet across the wireless channel B, which indicates itself as a DDB of the USB system that is operated across the wireless channel A (step 840). When the periodic packet from the wireless hub B (61) does not specify that a DDB connection can be made, a connection request packet cannot be transmitted. The wireless hub B (61) outputs a connection permission packet across the wireless channel B (step 850). For communication between a wireless hub and a wireless port, a port number is included in a connection permission packet because the port number is referenced when a state change is described by a bit map in the periodic packet. However, since notification of a state change is not always included in inter-host communication, whether the port number is included in the connection permission packet is arbitrarily determined. The wireless hub A (59), which received the connection permission packet, returns an ACK to the wireless hub B (61) across the wireless channel B (step 860). The wireless hub B (61) generates and activates the DDBb 62 and assigns it a port number (step 870). Although the DDBb 62 in this embodiment has the same device ID as the wireless hub B (61), it may have a different ID. It should be noted that the generation and activation of the DDBb 62 can also be performed upon the reception of connection request packet.

After transmitting the ACK, the wireless hub A (59) switches channels to the wireless channel A used by its own system, and transmits across that channel a periodic packet including the DDBb 62 as its destination (step 880). The DDB may be specified for the destination reception function by setting the wireless hub B (61) in the RID. The wireless hub B (61), which received the ACK and the periodic packet, transmits a connection request packet across the wireless channel A (step 890). Upon reception of the connection request packet, the wireless hub A (59) transmits a connection permission packet across the wireless channel A (step 900). In response to this, the wireless hub B (61) transmits an ACK packet across the wireless channel A (step 910). The wireless hub A (59), when it receives the ACK packet, selects a DDB other than the DDBb 62 for the following periodic packet (step 920). Therefore, when a periodic packet in which the wireless hub B (61) is not selected is received by the wireless hub B (61) across the wireless channel A, it is confirmed that the ACK has been received by the wireless hub A (59). The wireless hub B (61) correlatively stores the device ID of the wireless hub A (59), the wireless channel, and the port number of the DDBb 62 (step 930). The wireless hub A (59) correlatively stores the device ID of the wireless hub B (61), the wireless channel B, and the port number of the DDBa 60 (step 940). It should be noted that not all the setups are completed. The DDBa 60 and the DDBb 62 must be recognized respectively by the computer A and the computer B. To do this, the process in FIG. 4 should be performed by the computer and the wireless hub.

Through the above described processing, the USB address, the wireless channel data, the port number and the corresponding wireless hub ID are correlatively registered in the table in the wireless hub. The connection has established here.

Next, the process performed when the computer A has issued a communication request to the wireless hub A (59) will be described referring to FIG. 11. The wireless hub A (59) receives a communication request transmitted from the computer A (51) to the computer B (53) (step 1000), and returns a NAK packet to the computer A (step 1010). The wireless hub A (59) searches for a wireless channel that is used by the wireless hub B (61) connected to the computer B (53), switches channels to the pertinent wireless channel, detects a carrier, and transmits only a data packet to the wireless hub B (61) (step 1020). The communication request includes an OUT token and a data packet, but the OUT token is discarded. Since, after the communication request has been received, it may take some time before the data packet is transmitted to the wireless hub B (61), only the data packet is stored in the buffer of the DDBa 60.

Upon reception of the data packet, the wireless hub B (61) interprets the downstream packet as one for inter-host communication, and stores the packet data in the buffer of the DDBb 62 that corresponds to the transmission source ID (step 1030). The term downstream transmission is used to identify a transmission originating at a wireless hub, and upstream transmission is used to identify a transmission intended for a wireless hub. In this case, since the data packet is transmitted by the wireless hub A (59), its transmission direction is downstream. And since, commonly, a transmission from a wireless port is sent to a wireless hub, its transmission direction is upstream and it can thus be distinguished from the other type of transmission. When the data packet has been stored in the buffer of the DDBb 62, the wireless hub B (61) transmits an ACK to the wireless hub A (59) (step 1050). When the buffer is full and the data packet cannot be stored, a NAK is transmitted to the wireless hub A (59).

When the wireless hub A (59), which received the ACK, receives the same command having the same destination from the computer A (51), the wireless hub A (59) transmits an ACK to the computer A (59) (step 1040). The wireless hub B (61) transmits the received data packet in response to polling by the computer B (step 1060). And upon reception of the data packet, the computer B (53) transmits an ACK to the wireless hub B (61). In response to this, the wireless hub B (61) releases the buffer in which the data packet was stored (step 1070).

Figure 11:
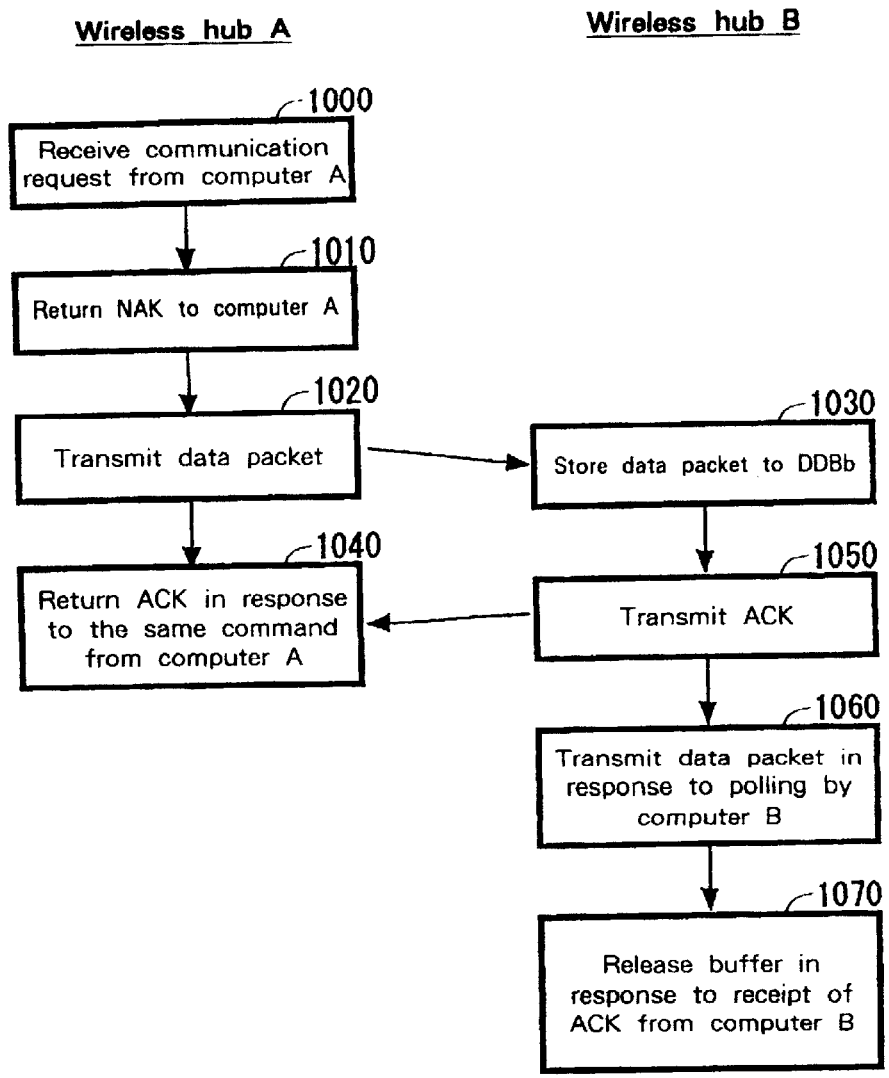
FIG. 11 is a flowchart for inter-host communication.

In the processing performed by the wireless hubs relative to the computers in FIG. 11, the DDB serves as a device to be connected to the USB. Since, for inter-host communication, the DDB employs a wireless channel differing from that used for communication with a wireless port, the DDB cannot constantly monitor a periodic packet for the wireless hub. Therefore, the presence of a packet transmitted from the other DDB is used to maintain a link. A link not used in communication for a predetermined period of time or longer is disconnected by the host. This period can be set arbitrarily. A USB system in which a link for the inter-host communication is extended cannot be set in the suspended state. The DDB performs a disconnection process upon reception of a port suspend command. When a system is suspended, all the links are disconnected. In this embodiment, the link for inter-host communication is disconnected in the following cases: (a) when a disconnection command is issued by the USB host; (b) when a reset is performed by a user; (c) when three sequential errors occur in one wireless transaction; (d) when the wireless hub or the wireless port is suspended; and (e) when there is no communication activity for a predetermined period or longer.

A disconnection command issued by one host is transmitted to the other by using a wireless control packet. Thus, the other host also performs the disconnection process. A disconnection performed under other conditions is not transmitted to the other system. The other system performs a disconnection process because of the occurrence of errors in a subsequent transaction or when there is no communication activity. A disconnected DDB cannot be used again during the time out period.

With the above described arrangement, a network can be built extremely easily, and a host can be designated in the same manner as is used for access to the device. In addition, since communication takes place only between hosts that are directly connected, that communication is limited to the range of the signals produced in the network. For communication outside the range, another host can be employed as an intermediate host. This is made possible by the implementation of a protocol for a higher layer and without changing any part of the above described arrangement. The upper level device driver is responsible for maintaining the topology of the bus and the communication route, and must assign physical addresses inherent to the inter-USB host communication network.

The above described embodiment is merely an example, and the present invention is not limited to this embodiment. The wireless hub 3 and the wireless port 5 can be divided into arbitrary blocks so as to perform the above described processing. Furthermore, although the computer 1 has only one USB connector, it may be provided with a plurality of connectors. The wireless port 5 is connected to only one device 7, but more than one device 7 can be connected. And, although in FIG. 1 the wireless hub 3 is provided outside the computer 1, it may be installed inside the computer 1. Similarly, although the wireless port 5 is provided outside the device 7, it may be installed inside the device 7. In addition, the control unit and the USB interface unit can be replaced with a microcontroller and a program.

The number of DDBs and the number of wireless ports in FIG. 8 are arbitrary, and the number of computers can be increased. The functional blocks employed for the DDB may also be arbitrarily provided, and are not limited to those in FIG. 9. Even when the timing for the performance of DDB generation and activation processing in FIG. 10 is not as shown in FIG. 10, it may not affect the connection process. For example, the DDBb 62 on the computer B side may be generated and activated between steps 830 and 850. The values used in the embodiment are only examples, and may be different when the implementation method is changed. One having skill in the relevant art will recognize that modifications may be made without departing from the spirit and scope of the invention as set forth in the appended claims.

Having thus described our invention, what we claim as new and desire to secure by Letters Patent is:

1. A method for providing wireless to universal serial bus (USB) communications for a first wireless apparatus to establish a connection with a second wireless apparatus, said second wireless apparatus communicating via USB with a computer, comprising the steps of:

receiving a packet acknowledging that connection with said second wireless apparatus is permitted;

transmitting a connection request packet including an identifier of said first wireless apparatus in response to receipt of said packet;

receiving a connection permission packet including bus information concerning said USB of said computer;

transmitting a predetermined packet in response to said connection permission packet; and setting the first wireless apparatus by said bus information when said predetermined packet does not specify said first wireless apparatus as a destination.

2. The method of to claim 1, further comprising a step of: transmitting a successive connection request packet, after said predetermined packet has been received, when said predetermined packet does specify said first wireless apparatus as a destination.

3. A method for providing wireless universal serial bus (USB) communications for establishing a connection with a first wireless apparatus by a second wireless apparatus communicating along a USB with a computer, comprising the steps of:

receiving a connection request packet, said connection request packet including an identifier of said first wireless apparatus;

generating bus information concerning said USB of said computer for said first wireless apparatus;

transmitting a connection permission packet including said bus information to said first wireless apparatus;

said second wireless apparatus receiving a predetermined packet from said first wireless apparatus; and setting said second wireless apparatus using said identifier and said bus information.

4. The method according to claim 3 wherein said connection permission packet includes first bus information and further comprising said computer generating computer bus information corresponding to said first bus information, and wherein said setting comprising setting said second wireless apparatus by said computer bus information.

5. The method according to claim 3 wherein said predetermined packet is not received within a predetermined period of time following transmission of said connection permission packet, further comprising a step of:

transmitting a packet that designates as a destination said first wireless apparatus, said first wireless apparatus having transmitted said connection request packet.

6. The method according to claim 3, further comprising receiving a periodic packet transmitted after said predetermined packet has been received, said periodic packet not specifying as a destination said first wireless apparatus that has transmitted said connection request packet.

7. The method of claim 3 wherein said first wireless apparatus is communicating along a second USB with a device, and further comprising the steps of:

receiving a communication request for said device from said computer;

transmitting a NAK signal to said computer along said second USB within a response time limit, said NAK signal indicating that said second wireless apparatus is not ready to perform processing; and forwarding said communication request to said first wireless apparatus.

8. The method according to claim 7, further comprising a step of:

transmitting at least one successive NAK signal to said computer from said second wireless apparatus along said second USB within said response limit until a response is received from said first wireless apparatus.

9. The method according to claim 7, wherein said communication request comprises a request for reading data from said device, further comprising the steps of:

receiving data from said first wireless apparatus;

transmitting a predetermined packet to said first wireless apparatus in response to receipt of said data; and transmitting said received data along said second USB to said computer.

10. The method according to claim 7, wherein said communication request is for writing data to said device, further comprising transmitting said data to be written with said communication request to said first wireless apparatus.

11. A method for performing wireless universal serial bus (USB) communication with a first wireless apparatus by a second wireless apparatus communicating along a USB with a device, comprising the steps for said second wireless apparatus of:

receiving a data reading request from said first wireless apparatus;

transmitting said read request along said USB to said device;

receiving data from said device and buffering said data at said second wireless apparatus;

returning a predetermined message to said device in response to receipt of said data; and transmitting said data to said first wireless apparatus.

12. A method for providing wireless universal serial bus (USB) communications for notifying a state change from a first wireless apparatus communicating along a USB with a computer to a second wireless apparatus, comprising the steps of:

receiving a first state command from said computer along said USB to said first wireless apparatus;

transmitting said first state command to said second wireless apparatus;

receiving said first state command at said second wireless apparatus; and transmitting a periodic packet including a state bit that indicates the state of said second wireless apparatus.

13. The method of claim 12 further comprising the steps of:

receiving a second state command along said USB from said computer;

transmitting said second state command from said first wireless apparatus to said second wireless apparatus;

changing the state of said second wireless apparatus; and transmitting a periodic packet including a state bit representing the state change for said second wireless apparatus in response to receipt of said second state command.

14. The method according to claim 13, wherein said predetermined command is one of a port suspend command and a disable command.

15. A wireless device for providing wireless universal serial bus (USB) communications for establishing a connection with a wireless apparatus communicating along a USB with a computer, comprising:

a receiving unit for receiving a wireless signal from said wireless apparatus;

a transmission unit for transmitting a wireless signal to said wireless apparatus; and a control unit for instructing said transmission unit to transmit a connection request packet, for instructing said transmission unit to transmit a predetermined packet in response to receipt of a connection permission packet by said receiving unit, said connection permission packet including bus information concerning said USB of said computer, and for employing said bus information to perform a setup in response to receipt of a packet by said receiving unit.

16. A wireless apparatus for providing wireless universal serial bus (USB) communications for communicating with a computer along a USB, comprising:

a receiving unit for receiving a wireless signal;

a transmission unit for transmitting a wireless signal; and a control unit for generating first bus information concerning said USB of said computer for a wireless device in response to a connection request packet received at said receiving unit from a wireless device, said connection request packet including an identifier of said wireless device, for instructing said transmission unit to transmit a connection permission packet including said first bus information to said wireless device, for employing said identifier and said first bus information to perform a setup when said receiving unit receives a predetermined packet from said wireless device, and for employing second bus information to perform a setup if said computer generates second bus information corresponding to said first bus information.

17. The wireless apparatus according to claim 16, further comprising clock means wherein, if said receiving unit does not receive said predetermined packet within a predetermined period of time following transmission of said connection permission packet, said control unit instructs said transmission unit to transmit a packet specifying as a destination said wireless device that transmitted said connection request packet.

18. A wireless apparatus for providing wireless universal serial bus (USB) communications for communicating with a computer along a USB, comprising:

a transmission unit for transmitting a wireless signal to a wireless device communicating with the apparatus;

a receiving unit for receiving a wireless signal from said wireless device; and a control unit comprising at least means for transmitting a NAK signal along said USB to said computer within a response limit in response to a request for communication with said apparatus from said computer, said NAK signal representing that said apparatus is not ready to perform processing, and means for instructing said transmission unit to transmit said communication request to said wireless device.

19. The wireless apparatus according to claim 18, further comprising timing means for monitoring response time for receiving a response from said wireless device and for comparing said response time to a response limit, wherein said control unit transmits at least one successive NAK signal to said computer within said response limit until said receiving unit receives a response from said wireless device.

20. The wireless apparatus according to claim 18, further comprising means for instructing said transmission unit to transmit a predetermined packet to said wireless device in response to that said receiving unit receives data from said wireless device when said communication request is for reading data from said apparatus, and wherein said control unit transmits said received data to said computer.

21. A wireless apparatus for providing wireless universal serial bus (USB) communications for communicating with a computer along a USB, comprising:

a receiving unit;

a transmission unit for transmitting a wireless signal to a wireless device; and a control unit for instructing said transmission unit to transmit a state command to said wireless device in response to receipt of said state command along said USB from said computer, for instructing said transmission unit to transmit a periodic packet including a state bit representing that said wireless device has changed state after the transmission of said state command.

22. The wireless apparatus of claim 21 wherein said wireless device comprises:

a receiving unit for receiving a wireless signal from said wireless apparatus; and a control unit comprising at least a clock determining component for, in response to receipt by said receiving unit of a periodic packet including a state bit representing the state of said wireless apparatus as disabled, determining whether or not a predetermined command was received from said wireless apparatus before said periodic packet was received, and state changing component for changing said state of said wireless device to a state other than a connected state if said predetermined command is not received.

23. A computer having a universal serial bus, comprising:

a bus controller for controlling said bus; and a wireless apparatus connected to said bus, said wireless apparatus including, a receiving unit for receiving a wireless signal;

a transmission unit for transmitting a wireless signal; and a control unit comprising generating means for generating first bus information concerning a bus of said computer for a wireless device in response to a connection request packet received at said receiving unit from a wireless device, said connection request packet including an identifier of said wireless device, for instructing said transmission unit to transmit a connection permission packet including said first bus information to said wireless device, for employing said identifier and said first bus information to perform a setup in response to that said receiving unit receives a predetermined packet from said wireless device, and for employing said second bus information to perform a setup if said second bus information corresponding to said first bus information is received from said bus controller.

24. The computer of claim 23 wherein said control unit further comprises timing means for monitoring a response limit, means for generating a NAK signal for transmission to said bus controller within a response limit in response to a request for communication with said apparatus from said bus controller, said NAK signal indicating that said apparatus is not ready to perform processing, and instruction means for instructing said transmission unit to transmit said communication request to said wireless device.

25. The computer of claim 23 wherein said control unit further comprises instruction means for instructing said transmission unit to transmit a suspend command to said wireless device in response to receipt of a suspend command from said bus controller, for instructing said transmission unit to transmit a periodic packet including a state bit representing said wireless device is in a suspended state, after said suspend command has been transmitted, and for instructing said transmission unit to transmit a periodic packet including a state bit representing said wireless device is in an enabled state, in response to receipt of a resume command from said bus controller.

26. A method for establishing a connection in wireless communication with a first computer by a second computer, said method comprising the steps of:

activating a first device bridge having an interface for a bus of said second computer and a buffer for storing data concerning said wireless communication, in response to a command from said second computer;

in response to receiving a connection permission packet from said first computer across said first wireless channel used by said first computer, transmitting across said first wireless channel to said first computer a connection request packet including data concerning a second wireless channel used by said second computer;

in response to receipt of a connection permission packet across said first wireless channel from said first computer, transmitting a predetermined packet across said first wireless channel to said first computer;

transmitting across said second wireless channel a packet specifying a second device bridge in said first computer, said second device bridge including an interface for a bus of said first computer and a buffer for storing data concerning said wireless communication;

in response to receipt of a connection request packet across said second wireless channel from said first computer, transmitting a connection permission packet to said first computer across said second wireless channel; and in response to receipt of a predetermined packet across said second wireless channel from said first computer, employing said data concerning said first wireless channel and first bus information concerning said bus of said second computer to perform a setup.

27. The method according to claim 26, further comprising a step of:

generating second bus information relative to said first device bridge.

28. A method for establishing a connection in wireless communication with a first computer by a second computer, said method comprising the steps of:

receiving a connection request packet including data concerning a first wireless channel used by said first computer, across a second wireless channel used by said second computer;

activating a second device bridge including an interface for a bus of said second computer and a buffer for storing data concerning said wireless communication;

transmitting a connection permission packet to said first computer across said second wireless channel;

receiving a periodic packet;

when said periodic packet designates said second device bridge across said first wireless channel from said first computer, transmitting a connection request packet to said first computer through said first wireless channel;

in response to receipt of a connection permission packet across said first wireless channel from said first compute, transmitting a predetermined packet; and when said periodic packet does not designate said second device bridge across said first wireless channel from said first computer, employing data concerning said first wireless channel and third bus information concerning a bus of said second computer to perform a setup.

29. The method according to claim 28, further comprising a step of:

generating fourth bus information relative to said second device bridge.

30. The wireless device of claim 15 wherein said wireless device is connected to a second computer, said wireless device further comprising:

a control module comprising at least activation component for activating a second device bridge having an interface for a bus of said second computer and a buffer for storing data concerning said wireless communication, instruction component for instructing said transmission module to transmit, across a first wireless channel, to said first computer a connection request packet including data concerning a second wireless channel used by said second computer, in response to that said receiving module receives across said first wireless channel used by said first computer a packet that permits connection of a device bridge, from said first computer, for instructing said transmission module to transmit a predetermined packet across said first wireless channel to said first computer in response to that said receiving module receives across said first wireless channel a connection permission packet from said first computer, for instructing said transmitting module to transmit across said second wireless channel, a packet specifying a first device bridge in said first computer, said first computer having an interface for a bus of said first computer and a buffer for storing data concerning said wireless communication, and for instructing said transmission module to transmit a connection permission packet to said first computer across said second wireless channel in response to that said receiving module receives across said second wireless channel a connection request packet from said first computer, and setup component for employing said data concerning said first wireless channel and first bus information concerning said bus of said second computer to perform a setup in response to receipt of a predetermined packet across said second wireless channel from said first computer.

31. The wireless apparatus of claim 16 wherein said wireless device is connected to a second computer, said wireless apparatus further comprising:

a control module comprising at least activation component for activating a second device bridge having an interface for a bus of said second computer and a buffer for storing data concerning said wireless communication, instruction component for instructing said transmission module to transmit a connection request packet to said first computer across a first wireless channel in response to that said receiving module receives across said first wireless channel a packet specifying said second device bridge from said first computer, and for instructing said transmission module to transmit a predetermined packet across said first wireless channel in response to that said receiving module receives across said first wireless channel a connection permission packet from said first computer, and setup component for employing data concerning said first wireless channel and third bus information concerning a bus of said second computer to perform a setup in response to that said receiving module receives across said first wireless channel a packet that does not designate said second device bridge, from said first computer.

32. The computer of claim 23 wherein said control unit further comprises an activation component for activating a device bridge having an interface for a bus of said computer and a buffer for storing data concerning said wireless communication, instruction component for instructing said transmission module to transmit across a second wireless channel to said second computer a connection request packet including data concerning a wireless channel used by said computer, in response to that said receiving module receives across said second wireless channel used by said second computer a packet permitting a connection by a device bridge from said second computer, for instructing said transmission module to transmit a predetermined packet across said second wireless channel to said second computer in response to that said receiving module receives across said second wireless channel a connection permission packet from said second computer, for instructing said transmitting module to transmit across said wireless channel a packet specifying a second device bridge in said second computer having an interface for a bus of said second computer and a buffer for storing data concerning said wireless communication, and for instructing said transmission module to transmit a connection permission packet to said second computer across said wireless channel in response to that said receiving module receives across said wireless channel said connection request packet from said second computer, and setup component for employing said data concerning said second wireless channel and first bus information concerning said bus of said computer to perform a setup in response to receipt of a predetermined packet across said wireless channel from said second computer.

* * * * *